US011694573B1

(12) United States Patent
Moncrief Brown et al.

(10) Patent No.: US 11,694,573 B1
(45) Date of Patent: Jul. 4, 2023

(54) AUGMENTED REALITY SYSTEM FOR EDUCATING DRIVERS OF VEHICLE DIMENSIONS

(71) Applicant: UIPCO, LLC, San Antonio, TX (US)

(72) Inventors: Donnette L. Moncrief Brown, San Antonio, TX (US); Robert Wiseman Simpson, Fair Oaks Ranch, TX (US); Manfred Amann, San Antonio, TX (US); Timothy Frank Davison, San Antonio, TX (US); Snehal Desai, Richardson, TX (US); Michael J. Maciolek, Boerne, TX (US); Kelsey Anne O'Brien, San Antonio, TX (US); Eric David Schroeder, San Antonio, TX (US); Emily Margaret Gray, San Antonio, TX (US); Justin Dax Haslam, San Antonio, TX (US); Matthew Ryan Santacroce, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 448 days.

(21) Appl. No.: 16/888,601

(22) Filed: May 29, 2020

(51) Int. Cl.
G09B 19/16 (2006.01)
G09B 5/02 (2006.01)
H04N 9/31 (2006.01)
G08G 1/16 (2006.01)
B60R 1/00 (2022.01)

(52) U.S. Cl.
CPC ............ G09B 19/167 (2013.01); G08G 1/165 (2013.01); G09B 5/02 (2013.01); H04N 9/3179 (2013.01); B60R 1/00 (2013.01); B60R 2300/802 (2013.01)

(58) Field of Classification Search
CPC ........ G09B 19/167; G09B 5/02; G08G 1/165; H04N 9/3179
USPC .......................................................... 434/66
See application file for complete search history.

(56) References Cited

U.S. PATENT DOCUMENTS

2021/0142526 A1* 5/2021 Mantyjarvi ....... B60W 50/0097

* cited by examiner

Primary Examiner — On S Mung
(74) Attorney, Agent, or Firm — Plumsea Law Group, LLC

(57) ABSTRACT

An augmented reality system may include a data gathering device configured to collect data regarding an environment exterior to the vehicle. In addition, the system may include a vehicle controller including a device processor and a non-transitory computer readable medium including instructions, executable by the processor, for performing the following steps: receiving data from the data gathering device; and transmitting information to a set of augmented reality goggles in order to facilitate a projection of a modified view of an interior of the vehicle based on the data collected regarding the environment exterior to the vehicle.

20 Claims, 8 Drawing Sheets

AUGMENTED REALITY SYSTEM FOR EDUCATING DRIVERS OF VEHICLE DIMENSIONS

TECHNICAL FIELD

The present disclosure generally relates to a system for educating drivers of vehicle dimensions and, more particularly, a system using augmented reality to project portions of the vehicle exterior when viewing from inside the vehicle.

BACKGROUND

Drivers often struggle to learn the dimensions of a newly obtained vehicle. For example, because the front and rear bumpers are out of sight, drivers often misjudge the distance between the bumpers and obstacles. This issue can be particularly problematic when the newly obtained vehicle is a significantly different size and/or configuration than the driver's previous vehicle. For example, a driver may trade in a small sedan for a large SUV. While the sedan may have had excellent visibility both front and rear, in the SUV, it may be much more difficult to judge the peripheral location of the vehicle's exterior components. Thus, an adjustment period may be required to learn the boundaries of a newly obtained vehicle. This adjustment period may be of considerable length as it can take a long time for a driver to learn the boundaries of their newly obtained vehicle without hitting obstacles in the process.

During this adjustment period, that is before the driver has confidently learned the boundaries of their newly obtained vehicle, drivers' unfamiliarity with the these boundaries can lead to many minor collisions. With vehicle bumpers now designed to absorb impact, these bumpers often become damaged in even the most minor collisions. A great many insurance claims are filed every year for minor collisions that happen in parking lots, etc.

The present disclosure addresses one or more of the issues discussed above.

SUMMARY

In one aspect, the present disclosure is directed to an augmented reality system. The system may include a data gathering device configured to collect data regarding an environment exterior to the vehicle. In addition, the system may include a vehicle controller including a device processor and a non-transitory computer readable medium including instructions, executable by the processor, for performing the following steps: receiving data from the data gathering device; and transmitting information to a set of augmented reality goggles in order to facilitate a projection of a modified view of an interior of the vehicle based on the data collected regarding the environment exterior to the vehicle.

In another aspect, the present disclosure is directed to an augmented reality system. The system may include a set of augmented reality goggles having a controller including a device processor and a non-transitory computer readable medium including instructions, executable by the processor, for performing the following steps: receiving information regarding an exterior environment of a vehicle from a controller of the vehicle; projecting an augmented view of an interior of the vehicle, wherein at least a portion of the environment outside of the vehicle replaces the view of a portion of the interior of the vehicle; and projecting a view of a virtual component of the exterior of the vehicle as part of the augmented view of the interior of the vehicle.

In another aspect, the present disclosure is directed to a method of educating a driver regarding dimensions of a vehicle. The method may include executing instructions stored in a non-transitory computer readable medium with a device processor of a vehicle controller to perform the following steps: receiving data from a data gathering device configured to collect data regarding an environment exterior to the vehicle; and transmitting information to a set of augmented reality goggles in order to facilitate the projection of a modified view of the exterior perimeter of the vehicle from within the vehicle.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The present disclosure is directed to an augmented reality system configured to facilitate drivers learning the dimensions of their vehicle. The driver wears a set of augmented reality goggles while seated in the driver's seat. When the driver looks toward the front or rear of the vehicle, an image of the vehicle bumper is projected in the augmented reality goggles in the location it exists relative to the other portions of the vehicle. That is, a virtual bumper replaces part of the interior when viewed through the goggles. In addition, the exterior proximate the bumper is also projected through the goggles so that the driver can see a distance between the bumper and the obstacle.

Thus, with this system, the driver can see what an obstacle looks like through the rearview window when the bumper is approaching the obstacle. This way, the driver can learn how to maneuver the vehicle in proximity to obstacles without colliding with the obstacles.

Figure 1:
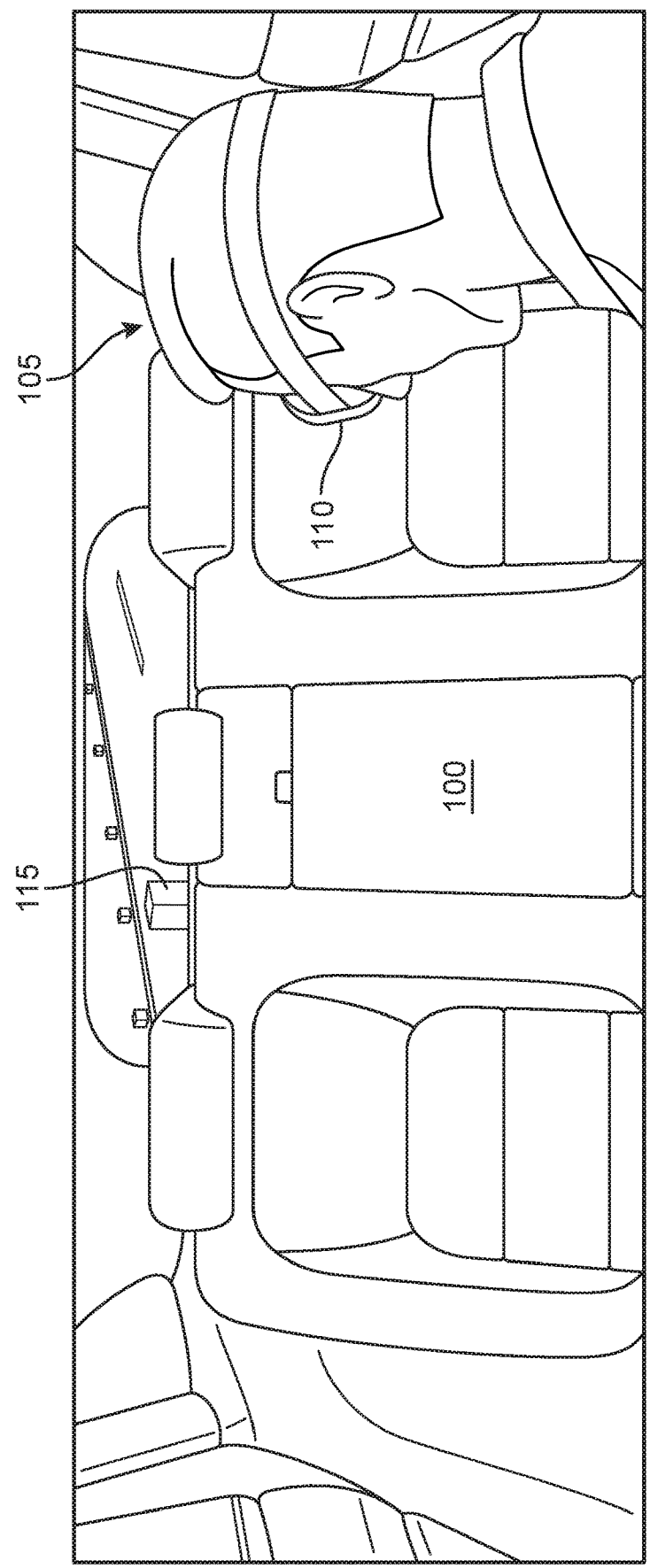
FIG. 1 is a schematic illustration of a rear view from within a vehicle.

FIG. 1 is a schematic illustration of a rear view from within a vehicle. As shown in FIG. 1, the exterior view from inside of a vehicle can be very limited. The distance between bumpers and obstacles can be difficult to judge, even if those obstacles are partially visible through a window. For example, as shown in FIG. 1, an interior 100 of a vehicle is shown. In FIG. 1, the vehicle is a sport utility vehicle (SUV), but the present disclosure is applicable to other types of vehicles as well, including sedans, pickup trucks, vans, sports cars, tractor-trailers (semis), etc. Also shown in FIG. 1, is a portion of a pole 115 visible through the rear window of the vehicle. FIG. 1 also shows a driver 105 in the driver's seat wearing augmented reality goggles 110. The driver is turning, looking back over their shoulder toward the rear of the vehicle.

Figure 2:
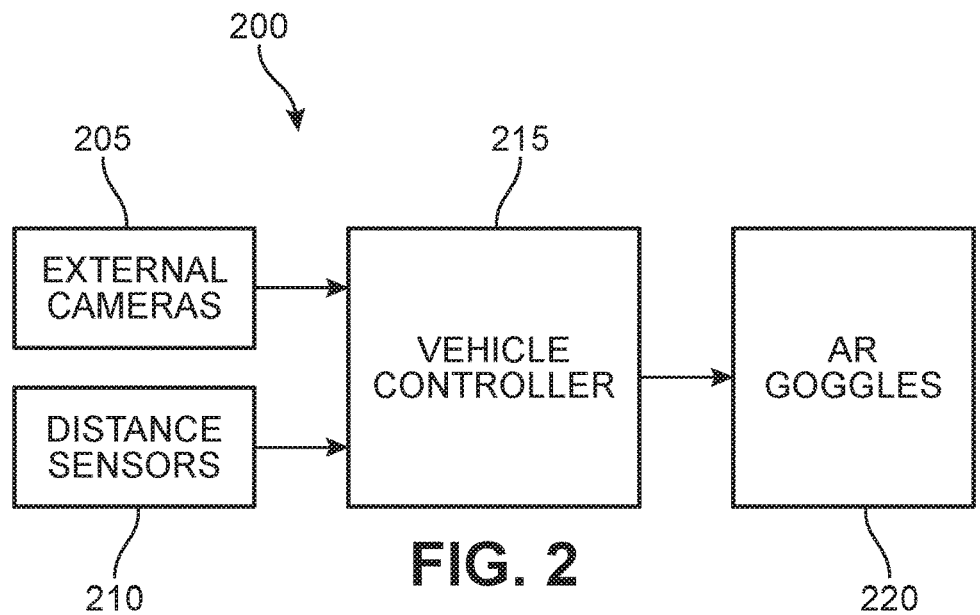
FIG. 2 is a schematic block diagram of an augmented reality system for facilitating learning of a vehicle's dimensions.

FIG. 2 is a schematic block diagram of an augmented reality system for facilitating learning of a vehicle's dimensions. A shown in FIG. 2, an augmented reality system 200 may include one or more data gathering devices configured to collect data regarding an environment exterior to the vehicle. For example, in some embodiments, the data gathering devices may include one or more external cameras 205 configured to record video of the environment external to the vehicle. The external cameras can be located at any suitable locations. For example, in some embodiments, a standard reverse camera can be used. Additionally, or alternatively, one or more cameras of the system can be located elsewhere about the perimeter of the vehicle.

Alternatively, or additionally, the data gathering devices may include one or more distance sensors 210 configured to detect distance between exterior portions of the vehicle and obstacles in the surrounding environment. In some embodiments, the system may collect data using the distance sensors of a conventional parking distance alert system. Additionally, or alternatively, the system may also use additional sensors that are the same or similar to those of the parking distance alert system, but placed elsewhere about the periphery of the vehicle. In some embodiments, such distance, or proximity, sensors may utilize ultrasound for distance detection. In some embodiments, the distance sensors may be electromagnetic sensors. Other types of distance sensors may also be utilized for the disclosed system.

As also shown in FIG. 2, system 200 may include a vehicle controller 215. That is, in some embodiments, system 200 may include a controller that is integrated with the vehicle. Vehicle controller 215 may be configured to receive data from external cameras 205 and/or distance sensors 210. In addition, as also shown in FIG. 2, controller 215 may be configured to transmit information to a set of augmented reality goggles 220. In some cases, vehicle controller 215 may be a computer that is a standard piece of the vehicle's equipment. For example, in some embodiments, the system may simply utilize the vehicle controller that operates the park distance monitoring system, or the computer that operates the vehicle's rear view camera system. Those computers receive the video and/or proximity data, which can then be used by the augmented reality goggles to provide an augmented view through the goggles.

In other cases, controller 215 may be a computer that is integrated with the vehicle, and is specially configured to facilitate operation of system 200. In still other cases, controller 215 may be a computer that is specially dedicated to handling the operation of system 200. For example, in such cases, controller 215 may be a computer that is retrofit to the vehicle in order to configure the vehicle for coordinated operation with the augmented reality goggles.

The vehicle controller may include a device processor and a non-transitory computer readable medium including instructions, executable by the processor, for receiving data from the data gathering device and transmitting information to a set of augmented reality goggles in order to facilitate a projection of a modified view of an interior of the vehicle based on the data collected regarding the environment exterior to the vehicle. For example, in some embodiments, the computer readable medium of the vehicle controller may include instructions for transmitting information regarding the location of a bumper of the vehicle to the augmented reality goggles to enable the augmented reality goggles to project an image of the bumper location to replace at least a portion of the view of the vehicle interior.

In some embodiments, the computer readable medium of the vehicle controller includes instructions for transmitting raw video and/or raw proximity data from one or more distance sensors to the augmented reality goggles. For example, data from a rear view camera and parking sensor system can be merely forwarded unprocessed to the augmented reality goggles, and the controller in the goggles may handle all processing to augment the projection within the goggles. In other embodiments, some or all of the processing of the collected data may be performed by the vehicle controller.

Figure 3:
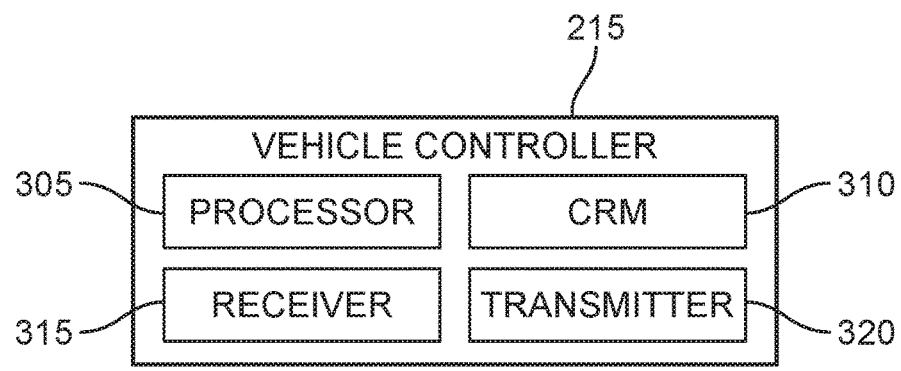
FIG. 3 is a schematic block diagram of a vehicle controller.

FIG. 3 is a schematic block diagram of a vehicle controller. FIG. 3 is a schematic block diagram of vehicle controller 215 according to a disclosed embodiment. As shown in FIG. 3, controller 215 may include various computing and communications hardware, such as servers, integrated circuits, displays, etc. Further, controller 215 may include a device processor 305 and a non-transitory computer readable medium 310 including instructions executable by device processor 305 to perform the processes discussed herein.

The non-transitory computer readable medium may include any suitable computer readable medium, such as a memory, e.g., RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, a read-only memory (ROM), a random access memory (RAM), a static random access memory (SRAM), a portable compact disc read-only memory (CD-ROM), an erasable programmable read-only memory (EPROM or Flash memory), a digital versatile disk (DVD), a memory stick, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

Vehicle controller 215 may include networking hardware configured to interface with other nodes of a network, such as a LAN, WLAN, or other networks. Further, controller 215 may be configured to receive data from a plurality of sources and communicate information to one or more external destinations. Accordingly, controller 215 may include a receiver 315 and a transmitter 320. (It will be appreciated that, in some embodiments, the receiver and transmitter may be combined in a transceiver.) In some cases, communications between components may be made via the Internet, a cellular network, Bluetooth, WiFi, or other suitable communications network.

Any suitable communication platforms and/or protocols may be utilized for communication between controller 215 and other components of the system. Since the various sources of information may each have their own platform and/or protocol, the system may be configured to interface with each platform and/or protocol to receive the data.

Figure 4:
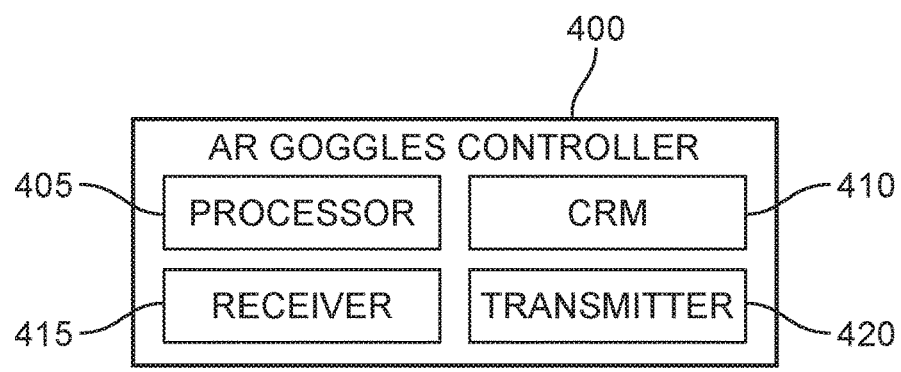
FIG. 4 is a schematic block diagram of an augmented reality goggles controller.

FIG. 4 is a schematic block diagram of an augmented reality (AR) goggles controller. As shown in FIG. 4, an AR goggles controller 400 may include a device processor 405, a non-transitory computer readable medium 410, a receiver 415, and a transmitter 420. The components of AR goggles controller 400 may be the same or similar to those described above with respect to the vehicle controller.

Computer readable medium 410 may include instructions, executable by device processor 405, for receiving information regarding an exterior environment of a vehicle from a controller of the vehicle; projecting an augmented view of an interior of the vehicle, wherein at least a portion of the environment outside of the vehicle replaces the view of a portion of the interior of the vehicle; and projecting a view of a virtual component of the exterior of the vehicle as part of the augmented view of the interior of the vehicle. The following figures illustrate these capabilities of the augmented reality system.

Figure 5:
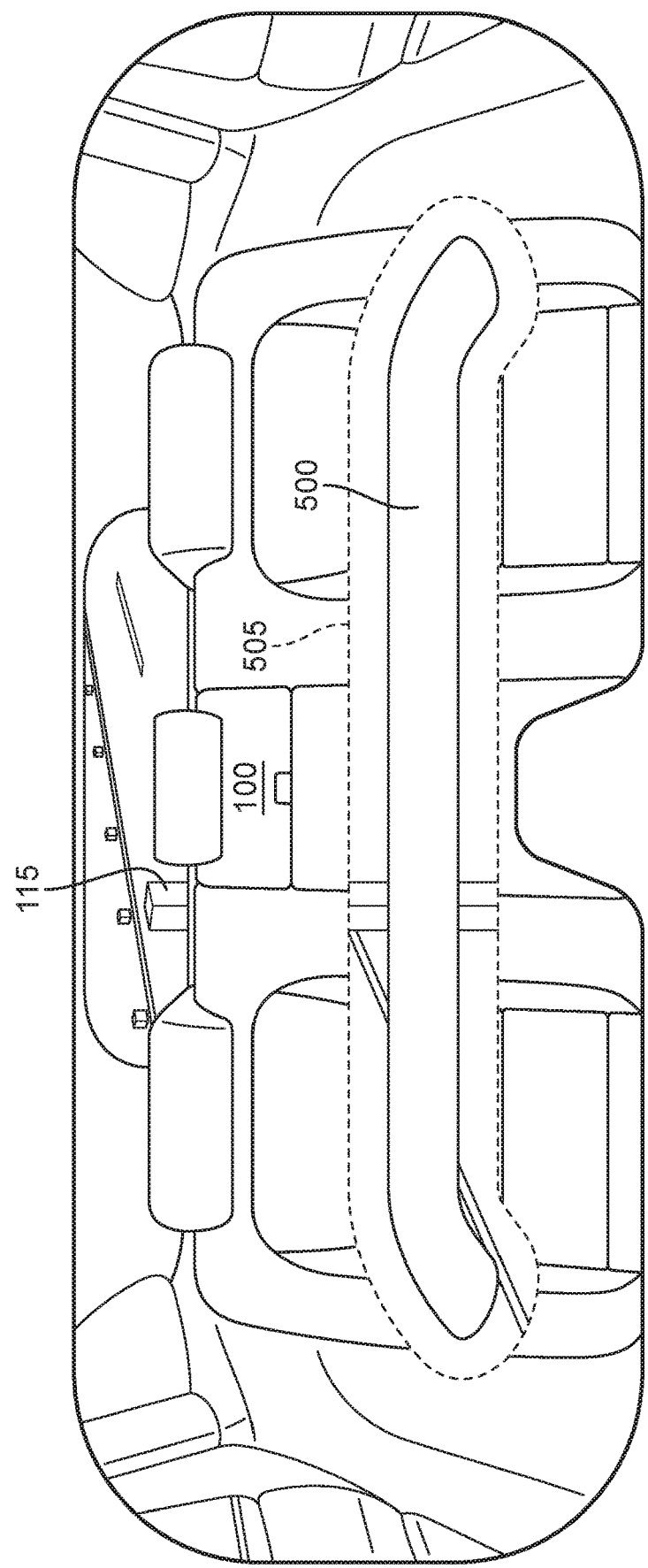
FIG. 5 is a schematic illustration of a rear interior of a vehicle as viewed through augmented reality goggles by a driver with a virtual bumper shown replacing a portion of the visible interior.

FIG. 5 is a schematic illustration of a rear interior of a vehicle as viewed through AR goggles by a driver with a virtual bumper shown replacing a portion of the visible interior. As shown in FIG. 5, a virtual bumper 500 may be projected when viewing interior 100 through the AR goggles. In some embodiments, virtual bumper 500 may be shown within an area 505 in which the view of interior 100 is replaced with a view of the exterior of the vehicle. Accordingly, a distance between pole 115 and bumper 500 can be seen via this virtual representation of bumper 500 and the reproduction of pole 115 in an area that would otherwise not be viewable.

When the driver utilizes this system, they can readily see the distance between bumper 500 and pole 115 in the inserted viewing area 505. At the same time, the top of pole 115 is still visible through the rear window. Accordingly, the driver is shown what pole 115 looks like through the rear window when it is a given distance from the rear bumper. For example, using the virtual projection, the driver can readily see that bumper 500 is approximately 6 inches from pole 115. With this information, the driver now knows approximately how large pole 115 appears in the rear window when it is approximately 6 inches from the actual rear bumper down below. In this way, the system can educate drivers of the dimensions of the vehicle. By learning the dimensions of their vehicle more quickly, they may avoid minor collisions, which may keep insurance costs down.

This is an improvement on the limitations of current backup camera systems and parking sensor systems, since the augmented reality image shows the vehicle bumper in its natural location, so the driver sees it at the natural perspective. In addition, the system shows the vehicle where the bumper is when they are looking rearward. This way, they can simultaneously see the location of the bumper and the view out the rear window. In reverse camera systems, the driver must look at the dashboard to see the rear-facing video, and must look back and forth to compare what is on the screen to what they see out the rear window. Audible alert systems do not provide a visual view of the distance to an obstacle. Although the audible alerts of a parking assist system may indicate a qualitative variation in the distance to an obstacle, learning of a vehicle's dimensions is much more intuitive and faster when the rear-facing AR video is provided.

In some cases, this system can be used for drivers after purchasing a new or pre-owned vehicle, or when the vehicle is to be driven by someone who does not normally drive it. For example, this system may be used when loaning a vehicle to a friend. The friend may spend a few minutes getting used to the vehicle before utilizing it as intended. Another use for this system may include teaching a student driver how to drive. Yet another use for this system may include educating a person about a rental vehicle. This may be particularly useful when renting larger vehicles, like large SUV's or moving trucks, which may be larger and/or have less visibility than the vehicles most people are used to driving.

Figure 6:
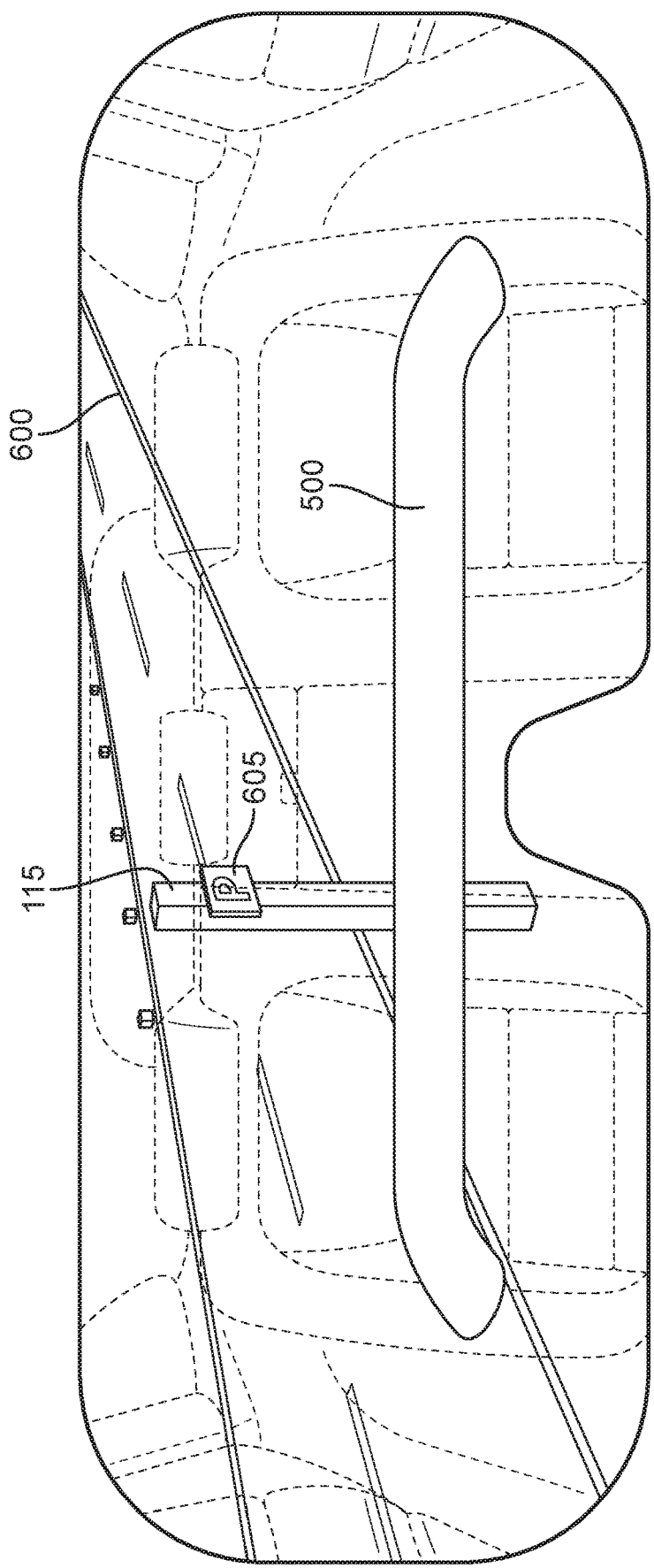
FIG. 6 is a schematic illustration of a rear interior of a vehicle as viewed through augmented reality goggles by a driver with an exterior view of the environment and a virtual bumper replacing substantially all of the visible interior.

In some embodiments, substantially all of the interior view may be replaced with a view of the exterior of the vehicle as well as a view of a virtual exterior component of the vehicle, such as a bumper. FIG. 6 is a schematic illustration of a rear interior of a vehicle as viewed through AR goggles by a driver. As shown in FIG. 6, in areas that do not include windows, the view of the interior is replaced with a view of the exterior environment of the vehicle. Because the exterior environment is projected to replace the interior view, curb 600 and sign 605 can be seen, which would otherwise be obstructed by the interior of the vehicle. In addition, virtual bumper 500 is shown in an area in which the actual bumper resides.

Figure 7:
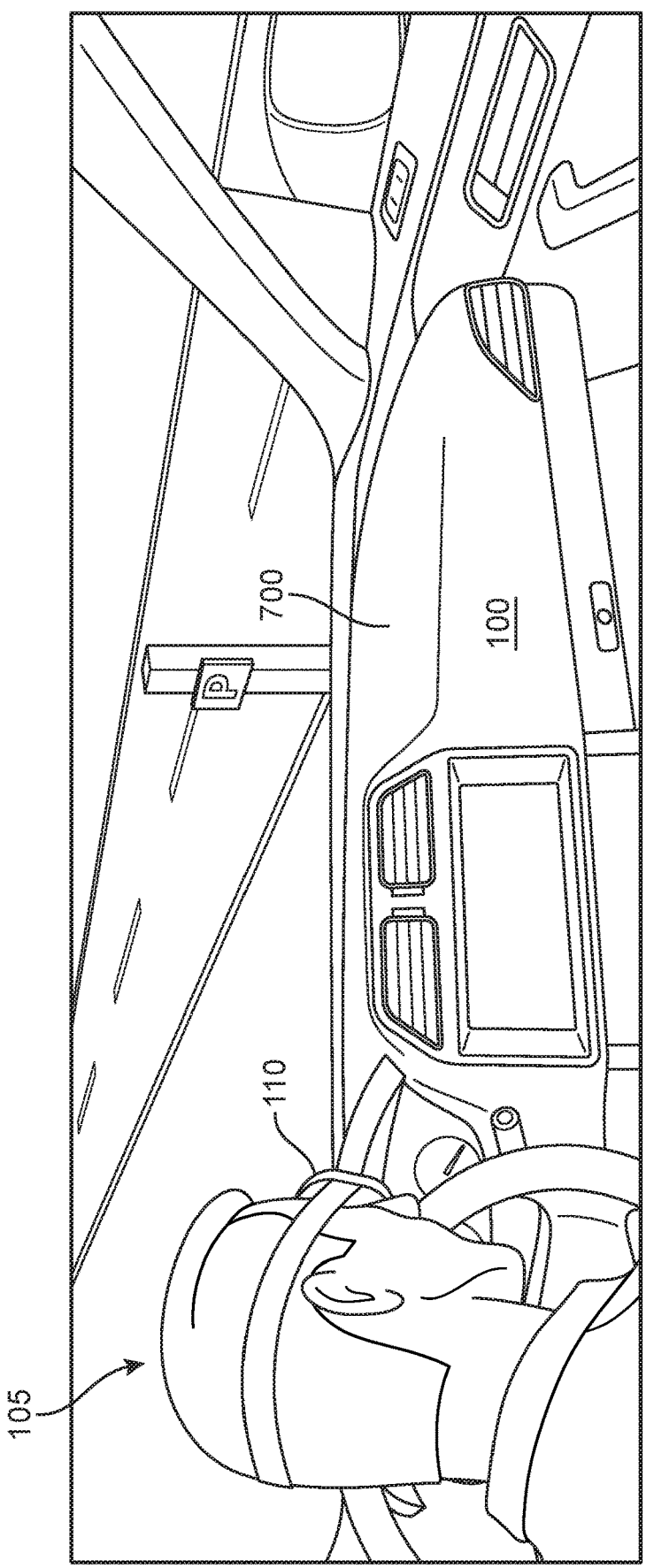
FIG. 7 is a schematic illustration of a view of a front interior of a vehicle.

The system can be used to learn the dimensions of other portions of the vehicle. For example, in some embodiments, the system may facilitate learning of the dimensions of a front portion of the vehicle, such as the relative position of the front bumper. FIG. 7 is a schematic illustration of a view of a front interior of a vehicle. As shown in FIG. 7, a front area of interior 100 of the vehicle is shown. For example, a dashboard 700 is illustrated. Driver 105 is once again shown wearing AR goggles 110. FIG. shows driver 105 looking toward the front right area of the vehicle, i.e., where the corner of the front bumper is located. Although in some vehicles, a portion of the hood or fender can be seen through the windshield, the location of the bumper and how far it sticks out from the fender and front grill cannot be seen.

Figure 8:
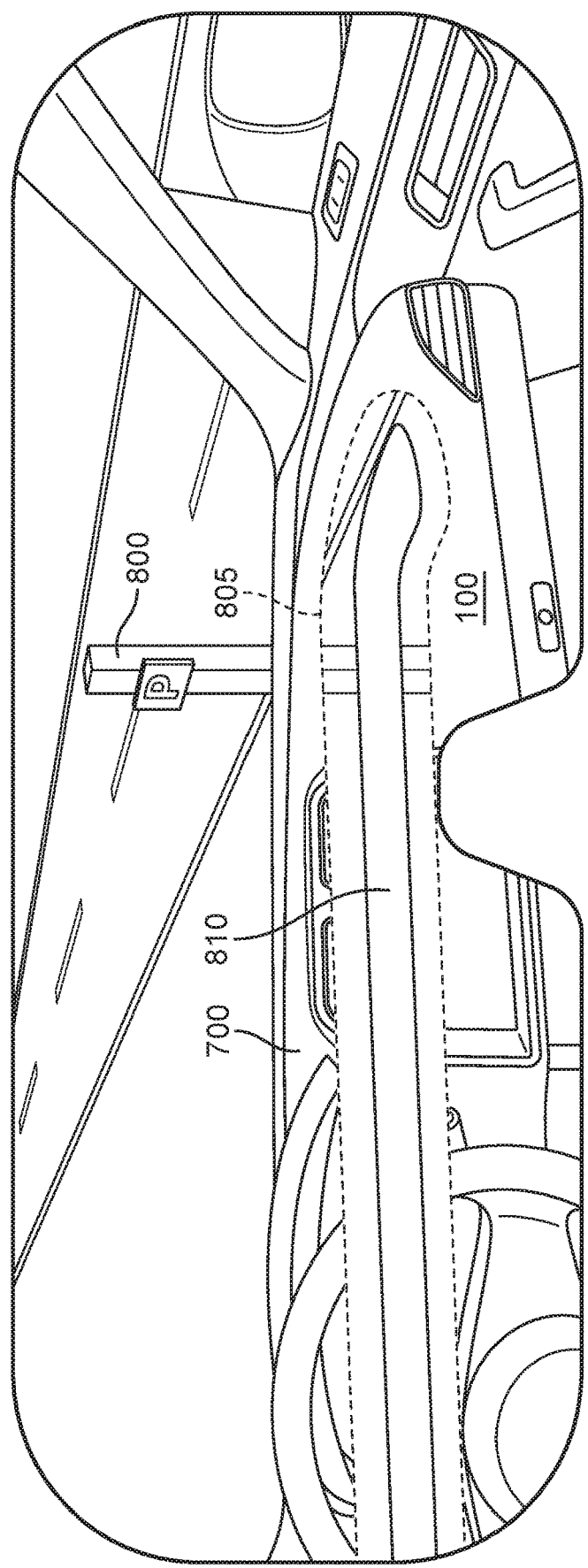
FIG. 8 is a schematic illustration of a view of a front interior of a vehicle through augmented reality goggles with a virtual bumper replacing a portion of the visible interior.

FIG. 8 is a schematic illustration of a view of a front interior of a vehicle through AR goggles with a virtual bumper replacing a portion of the visible interior. As shown in FIG. 8, a sign pole 800 is shown not only through the windshield, but also virtually in an area 805 in which the exterior environment is projected in replacement of the view of the vehicle interior 100. In addition, a virtual bumper 810 is shown in the location in which it resides relative to the rest of the vehicle. In this virtual area 805, the driver can readily see how close the bumper is to pole 800. Again, the driver can then learn how large pole 800 appears in the windshield when it is a given distance from the bumper.

Figure 9:
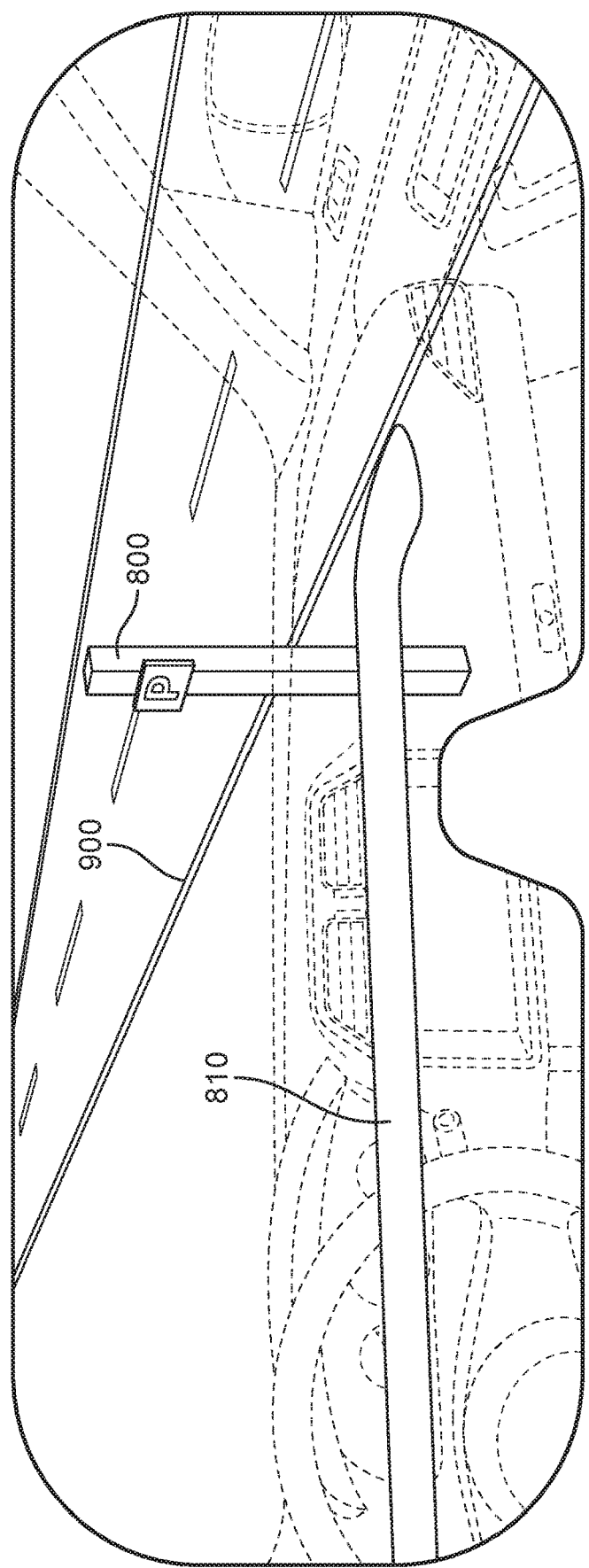
FIG. 9 is a schematic illustration of a view of a front interior of a vehicle through augmented reality goggles with an exterior view and a view of a virtual bumper replacing substantially all of the visible interior.

In some embodiments, virtually the entire interior view may be replaced with a view of the exterior environment. FIG. 9 is a schematic illustration of a view of a front interior of a vehicle through AR goggles with an exterior view and a view of a virtual bumper replacing substantially all of the visible interior. As shown in FIG. 9, elements of the exterior environment, like curb 900, are readily shown in replacement of the vehicle interior. In addition, virtual bumper 810 is once again projected.

Figure 10:
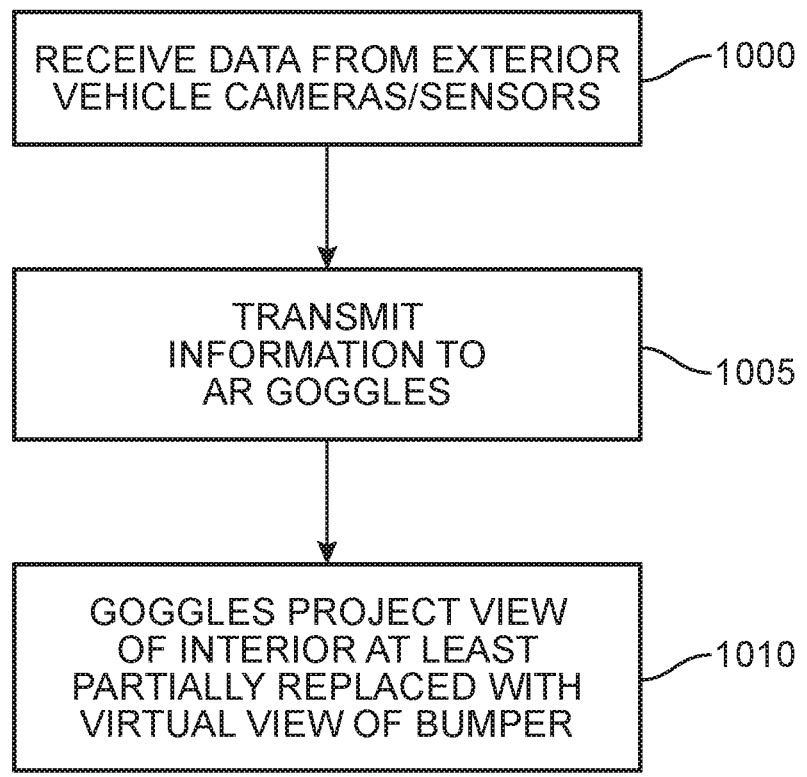
FIG. 10 is a flow chart illustrating a method of educating a driver regarding dimensions of a vehicle.

FIG. 10 is a flow chart illustrating a method of educating a driver regarding dimensions of a vehicle. The method may include receiving data from a data gathering device configured to collect data regarding an environment exterior to the vehicle. (Step 1000.) In addition, the method may include transmitting information to a set of AR goggles in order to facilitate the projection of a modified view of the exterior perimeter of the vehicle from within the vehicle. (Step 1005.) Steps 1000 and 1005 are performed by executing instructions stored in a non-transitory computer readable medium with a device processor of a vehicle controller. As discussed above, in some embodiments, the data transmitted to the AR goggles may be raw video and/or raw proximity data from one or more distance sensors. In such embodiments, the controller of the AR goggles may determine the location of the vehicle bumper(s) based on the data received. In other embodiments, the vehicle controller may process the collected data and transmit information to the AR goggles regarding the location of the bumper(s).

As shown in FIG. 10, the method may also include the AR goggles projecting a view of an interior of the vehicle that is at least partially replaced with a virtual view of one of the vehicle's bumpers. (Step 1010.) It will be noted that step 1010 is performed by executing instructions stored in a non-transitory computer readable medium with a device processor of a controller of the AR goggles. In some embodiments, the steps performed include sending image data for replacement of substantially all of an interior view of the vehicle with imagery of the exterior environment of the vehicle along with the virtual bumper embedded in the imagery of the exterior environment. In other embodiments, the controller of the AR goggles may perform the data processing that enables the goggles to project a view in which substantially all of the interior view of the vehicle is replaced.

These additional embodiments provide the same or similar advantages and benefits as discussed above with respect to FIG. 5.

The embodiments discussed herein may make use of methods and systems in artificial intelligence to improve efficiency and effectiveness of the disclosed systems. As used herein, "artificial intelligence" may include any known methods in machine learning and related fields. As examples, artificial intelligence may include systems and methods used in deep learning and machine vision.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with, or substituted for, any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

We claim:

1. An augmented reality system, comprising:
a data gathering device; and
a vehicle controller including a device processor and a non-transitory computer readable medium including instructions, executable by the processor, for performing the following steps:
receiving data regarding an environment exterior to the vehicle from the data gathering device; and
transmitting information to a set of augmented reality goggles in order to facilitate a projection of a modified view of an interior of the vehicle in which at least a portion of the interior of the vehicle is replaced in the modified view with a virtual exterior component of the vehicle based on the data collected regarding the environment exterior to the vehicle.

2. The system of claim 1, wherein the data gathering device includes one or more video cameras and the data collected includes video.

3. The system of claim 1, wherein the data gathering device includes one or more distance sensors and the data collected includes proximity data from the one or more distance sensors.

4. The system of claim 1, wherein the computer readable medium of the vehicle controller includes instructions for transmitting information regarding the location of a bumper of the vehicle to the augmented reality goggles to enable the augmented reality goggles to project an image of the bumper location to replace at least a portion of the view of the vehicle interior.

5. The system of claim 1, wherein the computer readable medium of the vehicle controller includes instructions for transmitting raw video and/or proximity data from one or more distance sensors to the augmented reality goggles.

6. The system of claim 1, wherein the computer readable medium of the vehicle controller includes instructions for sending information regarding the location of at least one of a front bumper and a rear bumper of the vehicle to the augmented reality goggles.

7. An augmented reality system, comprising:
a set of augmented reality goggles having a controller including a device processor and a non-transitory computer readable medium including instructions, executable by the processor, for performing the following steps:
receiving information regarding an exterior environment of a vehicle from a controller of the vehicle;
projecting an augmented view of an interior of the vehicle, wherein a virtual exterior component of the vehicle replaces the view of a portion of the interior of the vehicle; and
projecting a view of a virtual component of the exterior of the vehicle as part of the augmented view of the interior of the vehicle.

8. The system of claim 7, wherein the virtual exterior component of the vehicle is at least one of a front bumper and a rear bumper of the vehicle.

9. The system of claim 7, wherein the information received from the vehicle controller includes video from an exterior vehicle camera.

10. The system of claim 7, wherein the information received from the vehicle controller includes data from a distance sensor on an exterior of the vehicle.

11. The system of claim 7, wherein computer readable medium of the augmented reality goggles includes instructions for projecting a view of the interior of the vehicle with a portion of the interior replaced with a representation of a bumper of the vehicle located where it resides on the exterior of the vehicle.

12. The system of claim 7, wherein the computer readable medium of the augmented reality goggles includes instructions for projecting a view in which substantially all portions of the interior of the vehicle are replaced with a view of the exterior of the vehicle.

13. The system of claim 12, wherein the augmented view projected by the augmented reality goggles includes a representation of an exterior bumper of the vehicle embedded in the exterior view of the vehicle that replaces the interior view.

14. A method of educating a driver regarding dimensions of a vehicle, comprising:
executing instructions stored in a non-transitory computer readable medium with a device processor of a vehicle controller to perform the following steps:
receiving data from a data gathering device configured to collect data regarding an environment exterior to the vehicle; and
transmitting information to a set of augmented reality goggles in order to facilitate the projection of a modified view of the exterior perimeter of the vehicle from within the vehicle in which at least a portion of an interior of the vehicle is replaced in the modified view with a virtual exterior perimeter of the vehicle.

15. The method of claim 14, wherein the data gathering device includes one or more video cameras and the data collected includes video.

16. The method of claim 14, wherein the data gathering device includes one or more distance sensors and the data collected includes proximity data from the one or more distance sensors.

17. The method of claim 14, wherein the steps performed include transmitting raw video and/or proximity data from one or more distance sensors to the augmented reality goggles.

18. The method of claim 14, wherein the steps performed include sending information regarding the location of at least one of a front bumper and a rear bumper of the vehicle to the augmented reality goggles to facilitate projecting a virtual bumper in the augmented reality goggles.

19. The method of claim 18, wherein the steps performed include sending a bumper image for replacement of a portion of an interior view of the vehicle.

20. The method of claim 19, wherein the steps performed include sending image data for replacement of substantially all of an interior view of the vehicle with imagery of the exterior environment of the vehicle along with the virtual bumper embedded in the imagery of the exterior environment.

* * * * *